US011176142B2

(12) United States Patent
Xu

(10) Patent No.: US 11,176,142 B2
(45) Date of Patent: Nov. 16, 2021

(54) METHOD OF DATA QUERY BASED ON EVALUATION AND DEVICE

(71) Applicant: BEIJING BAIDU NETCOM SCIENCE TECHNOLOGY CO., LTD., Beijing (CN)

(72) Inventor: Weijian Xu, Beijing (CN)

(73) Assignee: BEIJING BAIDU NETCOM SCIENCE TECHNOLOGY CO., LTD.

(*) Notice: Subject to any disclaimer, the term of this patent is extended or adjusted under 35 U.S.C. 154(b) by 99 days.

(21) Appl. No.: 16/458,527

(22) Filed: Jul. 1, 2019

(65) Prior Publication Data

US 2019/0332602 A1 Oct. 31, 2019

(30) Foreign Application Priority Data

Jul. 2, 2018 (CN) .......................... 201810709407.X

(51) Int. Cl.
*G06F 16/245* (2019.01)
*G06F 16/2457* (2019.01)
*G06F 16/242* (2019.01)
*G06F 16/215* (2019.01)

(52) U.S. Cl.
CPC ...... *G06F 16/24575* (2019.01); *G06F 16/215* (2019.01); *G06F 16/242* (2019.01)

(58) Field of Classification Search
CPC .............................................. G06F 16/24575
See application file for complete search history.

(56) References Cited

U.S. PATENT DOCUMENTS 9,659,084 B1   5/2017 Zhang
2003/0195877 A1* 10/2003 Ford ...................... G06F 16/951
2006/0167864 A1*  7/2006 Bailey ................... G06Q 40/04
(Continued)

FOREIGN PATENT DOCUMENTS

CN   103778168 A   5/2014
CN   103886081 A   6/2014
(Continued)

OTHER PUBLICATIONS

First Office Action; CN Application No. 201810709407.X; dated Apr. 16, 2019; 9 pages.
(Continued)

*Primary Examiner* — Van H Oberly
(74) *Attorney, Agent, or Firm* — Dilworth IP, LLC

(57) ABSTRACT

A method of data query based on an evaluation and a device. The method includes: obtaining evaluation data of entities and basic information of the entities from multiple websites; extracting labels of the entities according to the evaluation data of the entities and the basic information of the entities; filtering the evaluation data of the entities; aggregating to obtain evaluation data of the same type of entities having the same label according to the basic information of the entities, the labels of the entities and the filtered evaluation data of the entities; and making a query to obtain information on a target entity according to a retrieval statement and the aggregated evaluation data of the same type of entities for each label. The method can make a query for information on a type of entities for a user, so that the user can compare the entities.

14 Claims, 5 Drawing Sheets

(56) References Cited

U.S. PATENT DOCUMENTS

| | | | | |
|---|---|---|---|---|
| 2008/0313130 | A1* | 12/2008 | Hammond | G06Q 90/00 |
| 2014/0052568 | A1* | 2/2014 | Robinson | G06Q 30/06 |
| | | | | 705/26.7 |
| 2014/0188897 | A1 | 7/2014 | Baker et al. | |
| 2018/0047071 | A1* | 2/2018 | Hsu | G06Q 30/0282 |

FOREIGN PATENT DOCUMENTS

| | | | |
|---|---|---|---|
| CN | 105488705 | A | 4/2016 |
| CN | 106528611 | A | 3/2017 |
| CN | 106528676 | A | 3/2017 |
| CN | 107169020 | A | 9/2017 |
| CN | 108182175 | A | 6/2018 |

OTHER PUBLICATIONS

Notice of Allowance; CN Application No. 201810709407.X; dated Jul. 9, 2019; 4 pages.

Carenini et al., "Extracting Knowledge from Evaluative Text", K-CAP '05, Copyright 2005 ACM, pp. 11-18.

Hu, et al., "Mining and Summarizing Customer Reviews", KDD '04, Copyright 2004 ACM, pp. 168-177.

Moghaddam et al., "Opinion Digger: An Unsupervised Opinion Miner from Unstructured Product Reviews", CIKM 10, Copyright 2010 ACM, pp. 1825-1828.

Extended European Search Report, Application No. EP 19183934.9-1217, dated Sep. 10, 2019, 11 pages.

\* cited by examiner

METHOD OF DATA QUERY BASED ON EVALUATION AND DEVICE

CROSS-REFERENCE TO RELATED APPLICATIONS

This application claims priority to Chinese Patent Application No. 201810709407.X, filed on Jul. 2, 2018, entitled "Method of Data Query Based on Evaluation and Device", which is incorporated herein by reference in its entirety.

FIELD

The disclosure relates to the field of data mining, and in particular, to a method of data query based on an evaluation and a device.

BACKGROUND

In the era of Internet information explosion, demand and consumption evaluations are growing in geometric multiples. It has become a shopping habit for many people to read evaluations before buying. The network public opinions themselves have the characteristics of loose organization, high randomness and scattered effectiveness, etc. The existence of Internet water armies, Internet trolls have further resulted in proliferation of low-quality data and invalid evaluations, thereby failing to provide effective evaluations for users.

In the prior art, a user can only make a query for some basic information and evaluation information of a specific product through a search engine, and when the user intends to make a query for a certain type of products having certain characteristics, the prior art cannot provide effective search result for the user.

SUMMARY

The disclosure provides a method and device of data query based on an evaluation, which can make a query for information on a type of entities for a user, so that the user can compare the entities.

A first aspect of the disclosure provides a method of data query based on an evaluation, including:

obtaining evaluation data of entities and basic information of the entities from multiple websites;

extracting labels of the entities according to the evaluation data of the entities and the basic information of the entities, where a label is used to indicate a user's view on an entity;

filtering the evaluation data of the entities;

aggregating to obtain evaluation data of the same type of entities having the same label according to the basic information of the entities, the labels of the entities and the filtered evaluation data of the entities; and making a query to obtain information on a target entity according to a retrieval statement and the aggregated evaluation data of the same type of entities for each of the labels, where the retrieval statement includes a type and a label of an entity, the target entity is a type of entities, each of which matches the type and the label of the entity included in the retrieval statement, and the information on the target entity includes basic information of the target entity and evaluation information of the target entity.

Optionally, before the extracting labels of the entities according to the evaluation data of the entities, the method further includes:

obtaining a retrieval term and retrieval times of the retrieval term corresponding to each type of entities in a preset period;

the extracting labels of the entities according to the evaluation data of the entities and the basic information of the entities includes:

extracting the labels of the entities according to the evaluation data of the entities, the basic information of the entities, and the retrieval term and the retrieval times of the retrieval term corresponding to each type of entities in the preset period.

Optionally, the obtaining basic information of the entities from multiple websites includes:

obtaining original information of the entities from the multiple websites, where the original information includes a name, a type, and a keyword of an entity; and identifying the same entity according to names, types and keywords of the entities, and obtaining the basic information of the entities.

Optionally, the filtering the evaluation data of the entities includes:

performing quality scoring on evaluations of the entities, and deleting evaluation data whose quality scoring is lower than a score threshold; and performing sensitive word marking on the evaluations of the entities, and deleting evaluation data containing a sensitive word.

Optionally, before the aggregating to obtain evaluation data of the same type of entities having the same label according to the basic information of the entities, the labels of the entities and the filtered evaluation data of the entities, the method further includes:

performing matching on the labels of the entities, and deleting a label of an entity that does not match the type of the entity from the labels of the entities; and performing emotion analysis on the evaluations of the entities to obtain emotional scores of the entities.

Optionally, the method further includes:

obtaining emotional fluctuation data of the entities according to the emotional scores of the entities;

the information on the target entity further includes the emotional fluctuation data of the entity.

Optionally, after the aggregating to obtain evaluation data of the same type of entities having the same label, the method further includes:

performing deduplication on the evaluation data of the same type of entities for each of the labels.

A second aspect of the disclosure provides a device of data query based on an evaluation, including:

a first obtaining module, configured to obtain evaluation data of entities and basic information of the entities from multiple websites;

a label extraction module, configured to extract labels of the entities according to the evaluation data of the entities and the basic information of the entities, where a label is used to indicate a user's view on an entity;

a filtration module, configured to filter the evaluation data of the entities;

an aggregation module, configured to aggregate to obtain evaluation data of the same type of entities having the same label according to the basic information of the entities, the labels of the entities, and the filtered evaluation data of the entities; and a query module, configured to make a query to obtain information on a target entity according to a retrieval statement and the aggregated evaluation data of the same type of entities for each of the labels, where the retrieval statement includes a type and a label of an entity, the target entity is a type of entities, each of which matches the type and the label of the entity included in the retrieval statement, and the information on the target entity includes basic information of the target entity and evaluation information of the target entity.

Optionally, the device further includes:

a second obtaining module, configured to obtain a retrieval term and retrieval times of the retrieval term corresponding to each type of entities in a preset period;

the label extraction module is specifically configured to:

extract the labels of the entities according to the evaluation data of the entities, the basic information of the entities, and the retrieval term and the retrieval times of the retrieval term corresponding to each type of entities in the preset period.

Optionally, the first obtaining module is specifically configured to:

obtain original information of the entities from the multiple websites, where the original information includes a name, a type, and a keyword of an entity; and identify the same entity according to names, types and keywords of the entities, to obtain basic information of the entities.

Optionally, the filtration module is specifically configured to:

perform quality scoring on evaluations of the entities, and delete evaluation data whose quality scoring is lower than a score threshold; and perform sensitive word marking on the evaluations of the entities, and delete evaluation data containing a sensitive word.

Optionally, the device further includes:

a label matching module, configured to perform matching on the labels of the entities, and delete a label of an entity that does not match the type of the entity from the labels of the entities;

an emotion analysis module, configured to perform emotion analysis on the evaluations of the entities, to obtain emotional scores of the entities; and a sorting module, configured to sort the evaluations of the entities according to an access popularity, or to scatter and sort the evaluations of the entities.

Optionally, the device further includes:

a third obtaining module, configured to obtain emotional fluctuation data of the entities according to the emotional scores of the entities;

the information on the target entity further includes the emotional fluctuation data of the entity.

Optionally, the device further includes:

a deduplication module, configured to perform deduplication on the evaluation data of the same type of entities for each of the labels.

A third aspect of the disclosure provides a server, including a processor, a memory and a transceiver, where the memory is configured to store instructions, the transceiver is configured to communicate with other device, the processor is configured to execute the instructions stored in the memory, so that the server performs the method as described in the first aspect of the disclosure.

A fourth aspect of the disclosure provides a computer readable storage medium, storing instructions which, when being executed, cause a computer to perform the method of the first aspect of the disclosure.

The method and device of data query based on an evaluation provided by the disclosure involve: obtaining the evaluation data of the entities and the basic information of the entities from multiple websites; extracting the labels of the entities according to the evaluation data of the entities and the basic information of the entities, where the label is used to indicate a user's view on an entity; filtering the evaluation data of the entities; aggregating to obtain evaluation data of the same type of entities having the same label according to the basic information of the entities, the labels of the entities and the filtered evaluation data of the entities; and making a query to obtain information on the target entity according to the retrieval statement and the aggregated evaluation data of the same type of entities for each label, where the retrieval statement includes a type and a label of an entity, and the target entity is a type of entities, each of which matches the type and the label of the entity included in the retrieval statement. The method can make a query for information on a type of entities for a user, so that the user can compare the entities.

BRIEF DESCRIPTION OF DRAWINGS

The accompanying drawings, which are incorporated into the specification and form part of the specification, illustrate embodiments of the disclosure and, together with the specification, explain principles of the disclosure.

The embodiments of the disclosure have been shown in the foregoing drawings and will be described in detail below. The drawings and the description are not intended to limit the scope of the disclosure in any way, but to illustrate the concept of the disclosure to those skilled in the art by referring to specific embodiments.

DETAILED DESCRIPTION

The technical solutions in embodiments of the disclosure will be clearly and completely described below in conjunction with the drawings of the embodiments of the disclosure, in order to make the purpose, technical solutions and advantages of the embodiments of the disclosure clearer. It is apparent that the described embodiments are some embodiments of the disclosure, but not all embodiments. All other embodiments obtained by those skilled in the art based on the embodiments of the disclosure without creative efforts are within the scope of the disclosure.

Figure 1:
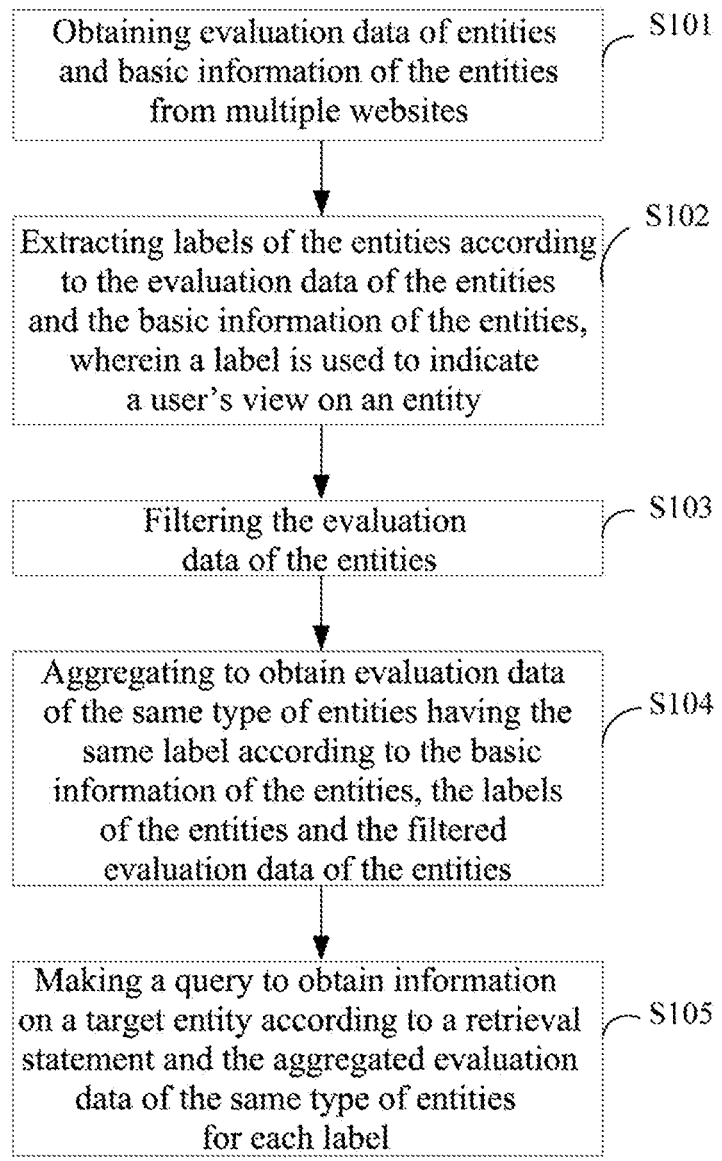
FIG. 1 is a flowchart of a method of data query based on an evaluation according to Embodiment 1 of the disclosure.

FIG. 1 is a flowchart of a method of data query based on an evaluation according to Embodiment 1 of the disclosure. The method in this embodiment is executed by a search engine or a server corresponding to a browser. As shown in FIG. 1, the method in this embodiment includes the following steps.

Step S101: obtaining evaluation data of entities and basic information of the entities from multiple websites.

Evaluation data of an entity includes: an evaluator, evaluation time, an evaluation item, evaluation content, and information of an evaluation object, and optionally, some related information. For example, in an evaluation for an electronic product, a performance evaluation and price evaluation for a new mobile phone will be accompanied by a comparative evaluation for a mobile phone with the same price. The evaluation data of the entity may be stored using a semi-structured data. The evaluation data of the entities may be obtained from multiple websites by a server through crawling, or may be provided by a third party.

The multiple websites may include various types of consumption websites, information websites, news web pages, hand-hunted information, etc., and obtaining evaluation data from multiple websites can make the obtained evaluation data more comprehensive and more accurate. The entity may include: various types of commodities, attractions, texts, applications, video players, games, etc., and any object used or purchased by a user may act as an entity. The evaluation data of the entity may be obtained by the method of this embodiment as long as the user evaluates the entity. Thus the method of this embodiment has an application scenario which is not limited to the commodity recommendation field, and thus has better versatility.

The basic information of an entity includes: a name, a type and a keyword of the entity, where the name of the entity is used to distinguish different entities, the type of the entity is used to distinguish categories of entities, and the keyword of the entity is used to describe a characteristic of the entity that is mainly concerned by the user. The type of the entity includes, for example, cars, mobile phones, computers, stereos, etc. The same type of entities has different models due to their manufacturers, versions, years, etc., and different types of entities have different keywords. For example, the user pays attention to fuel consumption, space, manipulation feeling, etc. for a car, then the keyword includes fuel consumption, space and manipulation feeling when the car is as an entity. The user pays attention to memory, pixel, battery, etc. for a mobile phone, then the keyword includes memory, pixel and battery when the mobile phone is as an entity.

The basic information of entities may be obtained by a server from multiple websites through crawling or may be provided by a third party, and the keywords of the entities may be preset. The server may directly obtain basic information of the entities from the multiple websites, or may obtain original information of the entities from the multiple websites. The original information includes names and keywords of the entities, and the original information of the entities comes from different websites. There may be a difference or an error in the name of the same entity on different websites. For example, an evaluation for the same mobile phone may come from multiple e-commerce websites such as JD, Gome, Dangdang, and there may be a difference or an error in original information of this entity obtained from different e-commerce websites. Therefore, it is necessary to identify the same entity according to the names and the keywords of the entities, and obtain the basic information of the entities.

Exemplarily, the identifying the same entity according to the names, the types, and the keywords of the entities, and obtaining the basic information of the entities specifically is, normalizing the original information of the entities, and accessing a standard entity, for example, core set entity information. The core set defines the types of the entities and the keywords of the entities, and the obtained original information of the entities can be matched with the entity information in the core set. If original information of multiple entities is the same as the same entity information in the core set, then it is determined that the multiple entities are the same entity. If the type of an entity does not exist in the core set, then a similarity calculation is conducted according to the name and the keyword of the entity by a modeling method, where if the similarity of two entities is greater than a preset similarity threshold, then the two entities are determined to be the same entity, and if the similarity of two entities is less than the preset similarity threshold, then the two entities are determined to be different entities.

Figure 2:
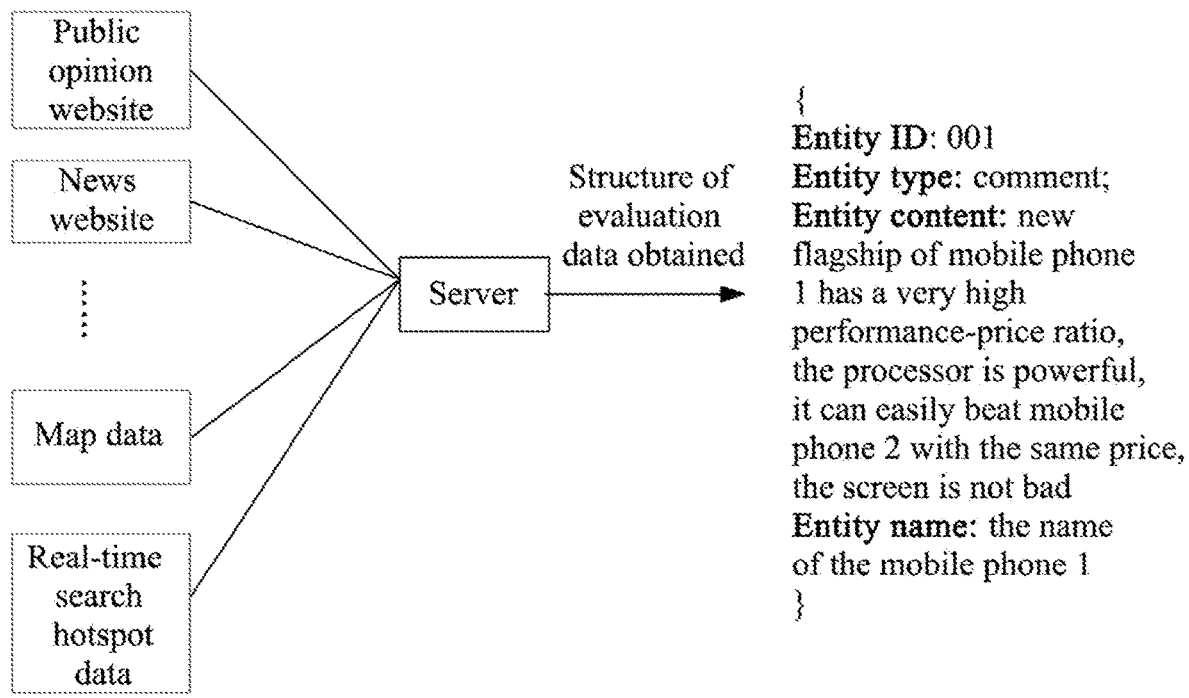
FIG. 2 is a schematic diagram of obtaining evaluation data and basic information of an entity.

FIG. 2 is a schematic diagram of obtaining evaluation data and basic information of an entity. As shown in FIG. 2, the server obtains evaluation data and basic information of an entity from a channel such as a public opinion website, a news website, map data, and real-time search hotspot data. Exemplarily, the obtained evaluation data of the entity is in the following form:

{
Entity ID: 001
Entity type: comment;
Entity content: new flagship of mobile phone 1 has a very high performance-price ratio, the processor is powerful, it can easily beat mobile phone 2 with the same price, the screen is not bad
Entity name: the name of the mobile phone 1
}

Step S102: extracting labels of the entities according to the evaluation data of the entities and the basic information of the entities, where a label is used to indicate a user's view on an entity.

The label can be the user's view on a keyword of the entity, and the label of the entity is used as a consumption evaluation label of a consumer who has purchased/experienced/used the entity. For example, keywords of a car are fuel consumption, space, and manipulation feeling, and then labels of a car X may be large fuel consumption, large space, and poor manipulation feeling. Keywords of a mobile phone include memory, pixel and battery, and then labels of a mobile phone X may be large memory, high pixel and short battery life. For example, labels of a hot pot are price, amount of helpings and taste, and then labels of a hot pot of merchant X can be high price, small amount of helpings and good taste.

The server identifies users' views on keywords of the entities from evaluations of the entities according to the keywords of the entities. Each entity involves multiple evaluations, and different evaluations may have different views on the same keyword. For example, for a viewpoint of pixels of a mobile phone X, the view of evaluation 1 is that the pixels are high, the view of evaluation 2 is that the pixels are ordinary, the view of evaluation 3 is that the pixels are too bad, and there is no evaluation on pixels in evaluation 4. The method of this embodiment can comprehensively obtain different views of users on an entity.

Step S103: filtering the evaluation data of the entities.

Exemplarily, the filtering processing includes one or more of the following.

(1) Perform quality scoring on the evaluations of the entities, and delete evaluation data whose quality scoring is lower than a score threshold.

Quality scoring is used to indicate the quality of each entity. There may be hundreds, thousands or even tens of thousands of evaluations for each entity, where some evaluations are valid and some evaluations are invalid. For example, in evaluations on a mobile phone, if a user evaluates other entity, such evaluation is an invalid evaluation; there are also some trolls and water armies on the network, they deliberately devalue an entity, and thus such evaluations have no reference value; some evaluations only give simply evaluations using one or two words, while some evaluations are rich in content. A quality scoring assessment is performed on an evaluation of an entity, to output a score between [0, 1], indicating the quality of this evaluation. The closer the score is to 1, the richer the evaluation content is; the closer the score is to 0, the more the evaluation is lack of actual content, for example, XXX has visited this place, scoring 0.06485. After each evaluation of each entity is scored, the evaluation data whose score is below the score threshold is deleted, and the evaluation data whose score is below the score threshold has no reference value.

(2) Perform sensitive word marking on the evaluations of the entities, and delete evaluation data containing a sensitive word.

The sensitive word includes a forbidden word, an infringing word, an indecent word, a political and inflammatory word, etc. The sensitive word marking is performed on the evaluations of the entities one by one, and then the evaluation data containing the sensitive word is deleted to resist some vulgar and bad information.

Step S104: aggregating to obtain evaluation data of the same type of entities having the same label according to the basic information of the entities, the labels of the entities and the filtered evaluation data of the entities.

There are thousands of entities in the disclosure, the evaluation data of the entities are aggregated according to types of the entities and labels of the entities. Exemplarily, the entities are first classed according to the types of the entities. Taking a certain type of entities as an example, this type of entities may have multiple labels. A target label is selected from the multiple labels each time, and it is determined which entities in this type of entities have the same label as the target label, and then the evaluation data of the entities having the same label as the target label are aggregated.

For example, according to types of entities, the entities are classed into cars and mobile phones. Labels of the cars are large fuel consumption, large space, and poor manipulation feeling, and labels of the mobile phones are large memory, high pixel, and short battery life. For types of the cars, there are 100 different cars. Taking the large fuel consumption as a target label and assuming that there are 20 cars with the large fuel consumption, the evaluation data of the 20 cars are aggregated together. The aggregation herein is a logical concept. An identification can be set for the evaluation data of the 20 cars to identify large fuel consumption of the cars. Taking the large space as a target label and assuming that there are 30 cars with the large space, the evaluation data of the 30 cars are aggregated together. Taking the poor manipulation feeling as a target label and assuming that there are 25 cars with the poor manipulation feeling, the evaluation data of the 25 cars are aggregated together.

Optionally, after aggregating and obtaining the evaluation data of the same type of entities having the same label, deduplication can be performed on the evaluation data of the same type of entities for each label. Deduplication refers to that for the data with the same evaluation content, only one piece of evaluation data is retained, and the remaining evaluation data is deleted. By deduplicating the evaluation data, the storage amount of the evaluation data is reduced, which facilitates the management of the evaluation data, and improves retrieval speed in the retrieval phase.

Step S105: making a query to obtain information on a target entity according to a retrieval statement and the aggregated evaluation data of the same type of entities for each label.

Where the retrieval statement includes a type and a label of an entity, the target entity is a type of entities, each of which matches the type and the label of the entity included in the retrieval statement, and the information on the target entity includes basic information of the target entity and evaluation information of the target entity.

The retrieval statement is sent to the server by a retrieval client (or referred to as a search engine, a browser, such as Baidu search), and the retrieval statement on the client is input by the user. The retrieval statement includes the type and the label of the entity, and the retrieval statement is used to retrieve a type of mobile phone, or to retrieve a mobile phone having a certain label. The retrieval statement may include one or more labels, which is not limited in this embodiment.

For example, the retrieval statement is: "Which are the cars with a large space?", then the type of the entity is car, and the label of the entity is large space. Or, the retrieval statement is: "A mobile phone with a price lower than 2000", then the type of the entity is mobile phone, and the label of the entity is price. Or the retrieval statement is: "A mobile phone with a price lower than 3000 and a high pixel", then the type of the entity is mobile phone, and the label of the entity is price and high pixel. The retrieval statement may be a text or a voice. If the user inputs the voice, a voice recognition is needed to convert the voice into a text, and then a query is made. The result of the query according to the text is the same as the result of the query according to the voice. The server or client needs to perform semantic analysis on the retrieval statement and then to make the query based on the result of the semantic analysis.

According to the retrieval statement, the server makes a query for a type of entities matching the type and label of the entity included in the retrieval statement from the same types of entities for the labels obtained by the aggregation so as to obtain the target entity, and the information of the target entity includes basic information and evaluation information of the target entity. The evaluation information includes a favorable evaluation rate, a negative evaluation rate, the number of favorable evaluations and the number of negative evaluations. The evaluation information may further include specific evaluation data.

For example, when the retrieval statement is: "Which are the cars with a large space?", then the information on the target entity obtained by the query includes a variety of models with a large space, as well as basic information and evaluation information of each model, so that the user can compare the variety of models.

Optionally, the information on the target entity further includes emotional fluctuation data of the entity. The emotional fluctuation data of the entity is obtained according to an emotional scoring for the entity, and correspondingly, emotion analysis on evaluations of the entities is required to obtain emotional scores. For example, contents of the evaluations are scored according to three-phase (positive, negative and middle) emotion analysis to obtain a basic attitude phase. Where the favorable evaluation rate, the negative evaluation rate, the number of favorable evaluations and the number of negative evaluations are also obtained based on the emotional scoring for the entity.

The emotional fluctuation data of the entity may be a trend of an emotion of the user during a detection period. For example, for a favorable fluctuation graph of a mobile phone in the last six months, the horizontal axis of the favorable fluctuation graph is time, the time unit may be week, and the longitudinal axis of the favorable fluctuation graph is the favorable evaluation rate. It can be seen from the favorable fluctuation graph that the word-of-mouth of the mobile phone has improved or worsened within half a year. The time units are different for different types of entities.

After obtaining the information on the target entity, the information on the target entity is displayed to the user, and the information of multiple entities may be displayed in the form of a list. Before displaying the target entity to the user, the information on multiple target entities may be sorted. Evaluations of the target entities may be sorted according to access heat of the target entities, or the evaluations of the target entities may be scattered and then sorted, which is not limited in this embodiment.

When the evaluations of the target entities are sorted according to the access heat, it is possible to advance the order of evaluations with more clicks/likes by the users and thus preferentially display these evaluations. For the evaluations that have been topped by the source website or designated as hot reviews, their weights are also increased, so that the user can quickly learn other consumers' major evaluations on the entities.

In some scenarios, the evaluations need to be scattered and sorted. By scattering, the evaluations of the target entities will not focus on evaluations of some major websites and ignore voices of users on other websites, which allows the users to fully learn evaluations of the entities.

Optionally, due to page interaction interface of a like page, for a presentation page of evaluation content, a visitor is allowed to evaluate the evaluation content within the page to form a new view and lock the traffic.

In this embodiment, the evaluation data of the entities and the basic information of the entities are obtained from multiple websites; the labels of the entities are extracted according to the evaluation data of the entities and the basic information of the entities, where the label is used to indicate a user's view on an entity; the evaluation data of the entities is filtered; the evaluation data of the same type of entities having the same label are obtained by aggregating according to the basic information of the entities, the labels of the entities and the filtered evaluation data of the entities; and a query for information on the target entity is made according to the retrieval statement and the aggregated evaluation data of the same type of entities for each label, where the retrieval statement includes the type and the label of the entity, and the target entity is a type of entities, each of which matches the type and the label of the entity included in the retrieval statement. The method can return information on a type of entities to the user, so that the user can compare the entities.

Figure 3:
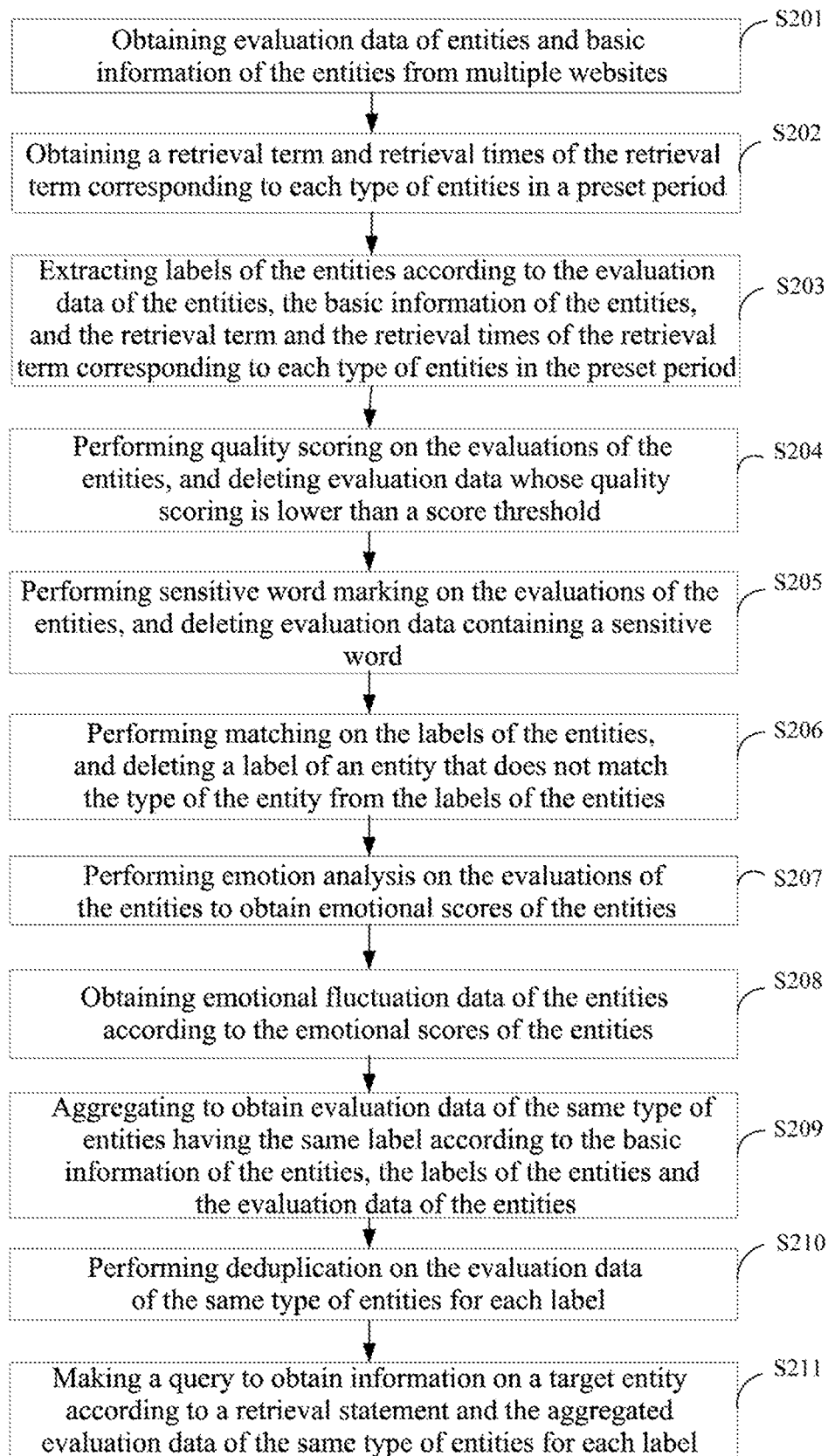
FIG. 3 is a flowchart of a method of data query based on an evaluation according to Embodiment 2 of the disclosure.

On the basis of Embodiment 1, FIG. 3 is a flowchart of a method of data query based on an evaluation according to Embodiment 2 of the disclosure. As shown in FIG. 3, the method in this embodiment includes the following steps.

Step S201: obtaining evaluation data of entities and basic information of the entities from multiple websites.

Step S202: obtaining a retrieval term and retrieval times of the retrieval term corresponding to each type of entities in a preset period.

The preset period is, for example, the latest day, the latest week, or the latest month, that is, statistics for the retrieval terms and data of the retrieval terms in the preset period is conducted according to types of entities. The types of entities include, for example, a car type, a mobile phone type, a game type and a fiction type, etc. In the same type of entities, the more the retrieval times of a certain retrieval term in the preset period, the higher the users' attentions to the retrieval term.

Exemplarily, the retrieval term here is a term extracted from a retrieval statement input by a user in a search box.

The retrieval statement may be a separate retrieval term, for example, the retrieval statement is "car X", then the retrieval term may be car X; the retrieval statement may also be a statement for retrieving information on a specific entity, for example, "How is the fuel consumption of the car X?", and at this time, the retrieval term is car X and fuel consumption; the retrieval statement may also be a statement for retrieving information on a type of entities, for example, "Which are the cars with lower fuel consumption?", and at this time, the retrieval term is fuel consumption.

Step S203: extracting labels of the entities according to the evaluation data of the entities, the basic information of the entities, and the retrieval term and the retrieval times of the retrieval term corresponding to each type of entities in the preset period.

The retrieval times of different retrieval terms for each type of entities can be obtained by step S202. The view of the retrieval term with more retrieval times can be extracted from the evaluation data of the entities and used as a label, and a user's view on a keyword is extracted from evaluations of the entities and used as a label.

Step S204: performing quality scoring on the evaluations of the entities, and deleting evaluation data whose quality scoring is lower than a score threshold.

Step S205: performing sensitive word marking on the evaluations of the entities, and deleting evaluation data containing a sensitive word.

Steps S204 and S205 are used for filtering the evaluation data of the entities.

Step S206: performing matching on the labels of the entities, and deleting a label of an entity that does not match the type of the entity from the labels of the entities.

Different types of entities have different labels. If labels of a certain type of entities include a label of other type of entity, the label of the other type of entity is deleted. For example, if a label of a mobile phone appears in labels of cars, then the label of the mobile phone is deleted.

Step S207: performing emotion analysis on the evaluations of the entities to obtain emotional scores of the entities.

Figure 4:
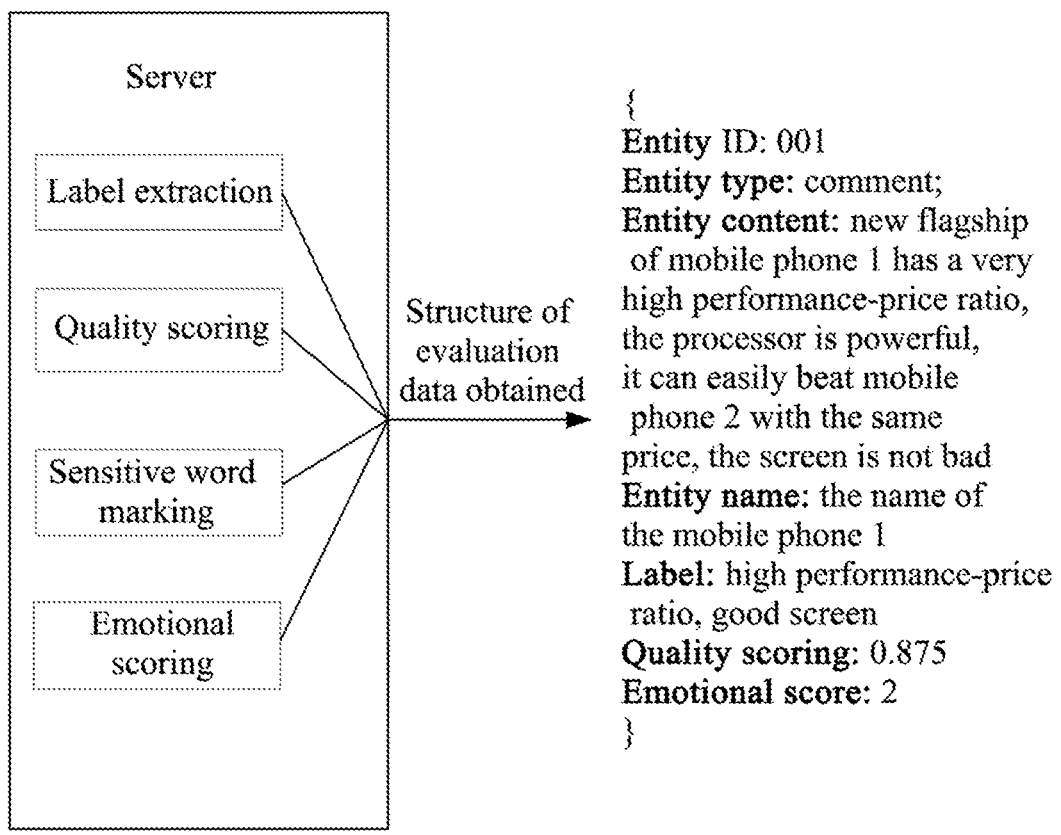
FIG. 4 is a schematic diagram of processing evaluation data of each entity.

FIG. 4 is a schematic diagram of processing evaluation data of each entity. As shown in FIG. 4, the following processing is performed on each entity: label extraction, quality scoring, sensitive word marking and emotion analysis. After performing the above processing on the evaluation data shown in FIG. 2, the evaluation data in the form shown in FIG. 4 is obtained as follows:

{
Entity ID: 001
Entity type: comment;
Entity content: new flagship of mobile phone 1 has a very high performance-price ratio, the processor is powerful, it can easily beat mobile phone 2 with the same price, the screen is not bad
Entity name: the name of the mobile phone 1
Label: high performance-price ratio, good screen
Quality scoring: 0.875
Emotional score: 2
}

In the above example, there is no sensitive word in the evaluation contents, so there is no sensitive word marking.

Step S208: obtaining emotional fluctuation data of the entities according to the emotional scores of the entities.

Step S209: aggregating to obtain evaluation data of the same type of entities having the same label according to the basic information of the entities, the labels of the entities and the evaluation data of the entities.

Step S210: performing deduplication on the evaluation data of the same type of entities for each label.

Step S211: making a query to obtain information on a target entity according to a retrieval statement and the aggregated evaluation data of the same type of entities for each label.

Where the retrieval statement includes a type and a label of an entity, the target entity is a type of entities, each of which matches the type and the label of the entity included in the retrieval statement, and the information on the target entity includes basic information of the target entity, evaluation information of the target entity, and emotional fluctuation data of the target entity.

Figure 5:
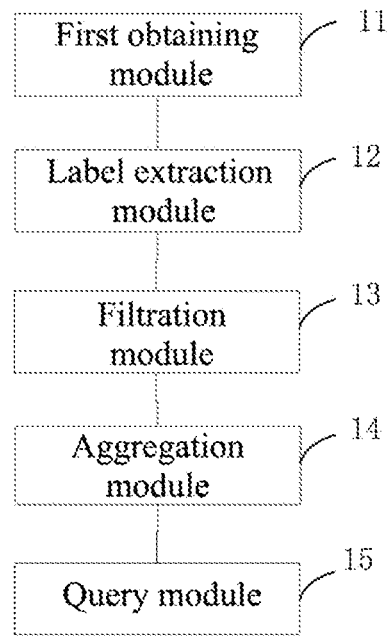
FIG. 5 is a schematic structural diagram of a device of data query based on an evaluation according to Embodiment 3 of the disclosure.

FIG. 5 is a schematic structural diagram of a device of data query based on an evaluation according to Embodiment 3 of the disclosure. The device may be integrated or applied in a server. As shown in FIG. 5, the device includes:

a first obtaining module 11, configured to obtain evaluation data of entities and basic information of the entities from multiple websites;

a label extraction module 12, configured to extract labels of the entities according to the evaluation data of the entities and the basic information of the entities, where a label is used to indicate a user's view on an entity;

a filtration module 13, configured to filter the evaluation data of the entities;

an aggregation module 14, configured to aggregate to obtain evaluation data of the same type of entities having the same label according to the basic information of the entities, the labels of the entities, and the filtered evaluation data of the entities;

a query module 15, configured to make a query to obtain information on a target entity according to a retrieval statement and the aggregated evaluation data of the same type of entities for each label, where the retrieval statement includes a type and a label of an entity, the target entity is a type of entities, each of which matches the type and the label of the entity included in the retrieval statement, and the information on the target entity includes basic information of the target entity and evaluation information of the target entity.

Optionally, the device further includes: a second obtaining module (not shown in the figure), configured to obtain a retrieval term and retrieval times of the retrieval term corresponding to each type of entities. Correspondingly, the label extraction module 12 is specifically configured to: extract the labels of the entities according to the evaluation data of the entities, the basic information of the entities, and the retrieval term and the retrieval times of the retrieval term corresponding to each type of entities in a preset period.

Optionally, the first obtaining module 11 is specifically configured to:

obtain original information of the entities from the multiple websites, where the original information includes a name, a type, and a keyword of an entity; and identify the same entity according to names, types and keywords of the entities, to obtain basic information of the entities.

Optionally, the filtration module 13 is specifically configured to:

perform quality scoring on evaluations of the entities, and delete evaluation data whose quality scoring is lower than a score threshold; and perform sensitive word marking on the evaluations of the entities, and delete evaluation data containing a sensitive word.

Optionally, the device further includes:

a label matching module (not shown), configured to perform matching on the labels of the entities, and delete a label of an entity that does not match the type of the entity from the labels of the entities; and an emotion analysis module (not shown), configured to perform emotion analysis on the evaluations of the entities, to obtain emotional scores of the entities.

Optionally, the device further includes: a third obtaining module (not shown), configured to obtain emotional fluctuation data of the entities according to the emotional scores of the entities. Correspondingly, the information on the target entity further includes the emotional fluctuation data of the entity.

Optionally, the device further includes: a deduplication module (not shown), configured to perform deduplication on evaluation data of the same type of entities for each label.

The device provided in this embodiment can be used to perform the methods of Embodiment 1 and Embodiment 2. The specific implementations and technical effects are similar to the methods, and details are not repeated here again.

Figure 6:
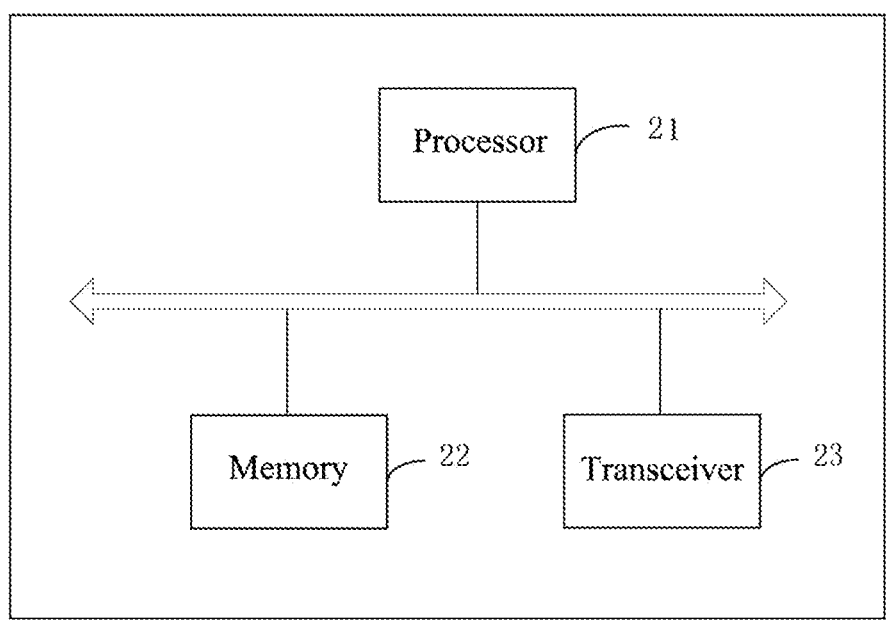
FIG. 6 is a schematic structural diagram of a server according to Embodiment 4 of the disclosure.

FIG. 6 is a schematic structural diagram of a server according to Embodiment 4 of the disclosure. As shown in FIG. 6, the server provided in this embodiment includes a processor 21, a memory 22, and a transceiver 23, where the memory 22 is configured to store instructions, the transceiver 23 is configured to communicate with other device, the processor 21 is configured to execute the instructions stored in the memory 22, so that the server performs the methods of Embodiment 1 and Embodiment 2 of the disclosure.

Embodiment 5 of the disclosure provides a computer readable storage medium, storing instructions that, when being executed, cause a computer to perform the methods of Embodiment 1 and Embodiment 2 of the disclosure.

What is claimed is:

1. A method of data query based on an evaluation, comprising:

obtaining evaluation data of entities and basic information of the entities from multiple websites;

extracting labels of the entities according to the evaluation data of the entities and the basic information of the entities, wherein the labels are used to indicate user's views on the entities;

filtering the evaluation data of the entities;

aggregating to obtain evaluation data of the same type of entities having the same label according to the basic information of the entities, the labels of the entities and the filtered evaluation data of the entities; and making a query to obtain information on a target entity according to a retrieval statement and the aggregated evaluation data of the same type of entities for each of the labels, wherein the retrieval statement comprises a type and a label of an entity, the target entity is a type of entities, each of which matches the type and the label of the entity comprised in the retrieval statement, and the information on the target entity comprises basic information of the target entity, evaluation information of the target entity and emotional fluctuation data of the target entity, and is displayed to the user, wherein the emotional fluctuation data is a trend of an emotion of the user during a detection period, before the extracting labels of the entities according to the evaluation data of the entities and the basic information of the entities, further comprising:

obtaining a retrieval term and retrieval times of the retrieval term corresponding to each type of entities in a preset period;

the extracting labels of the entities according to the evaluation data of the entities and the basic information of the entities comprises:

extracting the labels of the entities according to the evaluation data of the entities, the basic information of the entities, and the retrieval term and the retrieval times of the retrieval term corresponding to each type of entities in the preset period.

2. The method according to claim 1, wherein the obtaining basic information of the entities from multiple websites comprises:

obtaining original information of the entities from the multiple websites, wherein the original information comprises a name, a type, and a keyword of an entity; and identifying the same entity according to names, types and keywords of the entities, and obtaining the basic information of the entities.

3. The method according to claim 1, wherein the filtering the evaluation data of the entities comprises:

performing quality scoring on evaluations of the entities, and deleting evaluation data whose quality scoring is lower than a score threshold; and performing sensitive word marking on the evaluations of the entities, and deleting evaluation data containing a sensitive word.

4. The method according to claim 3, before the aggregating to obtain evaluation data of the same type of entities having the same label according to the basic information of the entities, the labels of the entities and the filtered evaluation data of the entities, further comprising:

performing matching on the labels of the entities, and deleting a label of an entity that does not match the type of the entity from the labels of the entities; and performing emotion analysis on the evaluations of the entities to obtain emotional scores of the entities.

5. The method according to claim 4, further comprising:
obtaining the emotional fluctuation data of the entities according to the emotional scores of the entities.

6. The method according to claim 1, after the aggregating to obtain evaluation data of the same type of entities having the same label, further comprising:

performing deduplication on the evaluation data of the same type of entities for each of the labels.

7. A device of data query based on an evaluation, comprising:

a processor and a computer-readable medium for storing program codes, which, when executed by the processor, cause the processor to:

obtain evaluation data of entities and basic information of the entities from multiple websites;

extract labels of the entities according to the evaluation data of the entities and the basic information of the entities, wherein a label is used to indicate a user's view on an entity;

filter the evaluation data of the entities;

aggregate to obtain evaluation data of the same type of entities having the same label according to the basic information of the entities, the labels of the entities, and the filtered evaluation data of the entities; and make a query to obtain information on a target entity according to a retrieval statement and the aggregated evaluation data of the same type of entities for each of the labels, wherein the retrieval statement comprises a type and a label of an entity, the target entity is a type of entities, each of which matches the type and the label of the entity comprised in the retrieval statement, and the information on the target entity comprises basic information of the target entity, evaluation information of the target entity and emotional fluctuation data of the target entity, and is displayed to the user, wherein the emotional fluctuation data is a trend of an emotion of the user during a detection period, the program codes further cause the processor to:

obtain a retrieval term and retrieval times of the retrieval term corresponding to each type of entities in a preset period; and extract the labels of the entities according to the evaluation data of the entities, the basic information of the entities, and the retrieval term and the retrieval times of the retrieval term corresponding to each type of entities in the preset period.

8. The device according to claim 7, wherein the program codes further cause the processor to:

obtain original information of the entities from the multiple websites, wherein the original information comprises a name, a type, and a keyword of an entity; and identify the same entity according to names, types and keywords of the entities, to obtain basic information of the entities.

9. The device according to claim 7, wherein the program codes further cause the processor to:

perform quality scoring on evaluations of the entities, and delete evaluation data whose quality scoring is lower than a score threshold; and perform sensitive word marking on the evaluations of the entities, and delete evaluation data containing a sensitive word.

10. The device according to claim 9, wherein the program codes further cause the processor to:

perform matching on the labels of the entities, and delete a label of an entity that does not match the type of the entity from the labels of the entities;

perform emotion analysis on the evaluations of the entities, to obtain emotional scores of the entities; and sort the evaluations of the entities according to an access popularity, or to scatter and sort the evaluations of the entities.

11. The device according to claim 10, wherein the program codes further cause the processor to:

obtain the emotional fluctuation data of the entities according to the emotional scores of the entities.

12. The device according to claim 7, wherein the program codes further cause the processor to:

perform deduplication on the evaluation data of the same type of entities for each of the labels.

13. A server, comprising a processor, a memory and a transceiver, wherein the memory is configured to store instructions, the transceiver is configured to communicate with other device, the processor is configured to execute the instructions stored in the memory, so that the server performs the method according to claim 1.

14. A computer readable storage medium, storing instructions that, when being executed, cause a computer to perform the method according to claim 1.

* * * * *